(12) United States Patent
Gal et al.

(10) Patent No.: US 8,352,072 B2
(45) Date of Patent: Jan. 8, 2013

(54) SYSTEM FOR EXTENDING THE OBSERVATION, SURVEILLANCE, AND NAVIGATIONAL CAPABILITIES OF A ROBOT

(75) Inventors: Ehud Gal, Reut (IL); Gennadiy Berinsky, Modi'in (IL); Yosi Wolf, Tel Aviv (IL)

(73) Assignees: Wave Group Ltd., Tel Aviv (IL); O.D.F. Optronics Ltd., Tel Aviv (IL)

( * ) Notice: Subject to any disclaimer, the term of this patent is extended or adjusted under 35 U.S.C. 154(b) by 351 days.

(21) Appl. No.: 12/671,689

(22) PCT Filed: Aug. 7, 2008

(86) PCT No.: PCT/IL2008/001089
§ 371 (c)(1),
(2), (4) Date: Apr. 26, 2010

(87) PCT Pub. No.: WO2009/019699
PCT Pub. Date: Feb. 12, 2009

(65) Prior Publication Data
US 2011/0035054 A1 Feb. 10, 2011

(30) Foreign Application Priority Data
Aug. 8, 2007 (IL) .......................................... 185124

(51) Int. Cl.
*G06F 19/00* (2011.01)
(52) U.S. Cl. ...... 700/245; 700/255; 700/258; 318/568.1
(58) Field of Classification Search .................. 700/245, 700/255, 258; 318/568.1, 568.11
See application file for complete search history.

(56) References Cited

U.S. PATENT DOCUMENTS

| 4,736,826 | A | 4/1988 | White et al. |
| 4,746,977 | A | 5/1988 | White |
| 6,459,955 | B1 | 10/2002 | Bartsch et al. |
| 6,535,793 | B2 * | 3/2003 | Allard ........................... 700/259 |
| 6,760,648 | B2 * | 7/2004 | Sakamoto et al. ............ 700/245 |
| 6,889,118 | B2 * | 5/2005 | Murray et al. ................ 700/250 |
| 7,211,980 | B1 | 5/2007 | Bruemmer et al. |
| 8,073,564 | B2 * | 12/2011 | Bruemmer et al. ........... 700/245 |
| 2003/0093187 | A1 | 5/2003 | Walker |
| 2003/0171846 | A1 * | 9/2003 | Murray et al. ................ 700/245 |
| 2004/0199290 | A1 * | 10/2004 | Stoddard et al. ............. 700/248 |
| 2005/0096790 | A1 | 5/2005 | Tamura et al. |
| 2005/0204438 | A1 * | 9/2005 | Wang et al. ........................ 901/1 |
| 2005/0234592 | A1 * | 10/2005 | McGee et al. ................ 700/245 |
| 2006/0015215 | A1 * | 1/2006 | Howard et al. ............... 700/245 |

FOREIGN PATENT DOCUMENTS
WO 2008135978 A2 11/2008

* cited by examiner

*Primary Examiner* — Toan To
(74) *Attorney, Agent, or Firm* — Marsteller & Associates, P.C.

(57) ABSTRACT

The invention is a system that is integrated with an existing robotic system in order to extend its observation, surveillance, and navigational capabilities. The system comprises: a sensor module comprising imaging and other types of sensors that is attached to the robotic device of the robotic system and a system control station comprising a communication link to the robot control station of the existing robotic system. Both the system control station and the sensor module comprise processing units that are configured to work in complete harmony. These processing units are each supplied with software that enables using information supplied by the sensors and other components in the sensor module to provide the robotic systems with many advanced capabilities that could not be achieves prior to attachment of the sensor module to the robot.

14 Claims, 5 Drawing Sheets

SYSTEM FOR EXTENDING THE OBSERVATION, SURVEILLANCE, AND NAVIGATIONAL CAPABILITIES OF A ROBOT

FIELD OF THE INVENTION

The present invention relates to the field of robotics. More particularly, the invention relates to a system comprised of a sensor module comprising a variety of sensors that can be attached to an existing robot, thereby extending the observation, surveillance, and navigational capabilities of the robot, and a system control station.

BACKGROUND OF THE INVENTION

Mobile robotic platforms are widely used in several fields. There are robotic devices used for security for example, robotic platforms equipped with means used for fighting terrorism, e.g. collecting real time information in hostage situations or gathering information behind enemy lines. Robotic platforms are also used for civilian purposes, for example inspecting for leaks of hazardous substances at industrial or regional facilities where nuclear, biological or chemical materials are manufactured. There are also robotic platforms used for domestic purposes such as cleaning floors or mowing a lawn. Non-mobile robots are also common, for instance robots designed for use in industrial facilities and in factories to carry out manufacturing procedures.

Robots of all types are generally designed and equipped with specific means suitable to enable them to carry out specific tasks. For example, robotic platforms designed for observation will comprise different types of imaging and listening devices; and robotic platforms designed to be mobile and remotely navigated will generally comprise imaging sensors, navigation aids such as a GPS system or internal compass, and communication means to exchange information and instructions with a remote control station. Some robots are preprogrammed to carry out tasks autonomously and others are operated manually or semi-automatically, either locally or remotely, by means of interfaces and control devices such as a joystick or a computer mouse.

Some typical publications that demonstrate the state of the art are: U.S. Pat. No. 4,746,977 describes a remotely operated steerable vehicle especially usable as a teleooperated mobile robot system. The vehicle carries a video camera which shows the field of view directly ahead. A remote control station has a video monitor showing said field of view with left and right upwardly converging guidelines on the monitor screen representing the left and right edges of the area traversed by the vehicle if it moves straight into the field of view. The guidelines on the screen provide an excellent and inexpensive aid to the operator who steers the vehicle from a remote location. However, everything outside the guidelines will be missed.

U.S. Pat. No. 4,736,826 describes a mobile robot remotely controlled and/or powered through a cable from a stationary console. The robot carries a cable management arrangement which stores the cable and dispenses and retracts it as needed. The arrangement lays down the cable under zero tension when the robot is outbound and reels it in as the robot returns to allow the robot to follow a path without entangling the cable. However if the robot goes for example around a tree it will have to return by the same path for the cable not to be entangled. The robot can have numerous configurations such as a simple configuration for use as a transporter for mail in an office and parts in a factory, to a complex configuration with robotic arms and sensors for use in remote surveillance and security work.

U.S. Pat. No. 6,459,955 describes a cleaning robot comprising a platform and drive system to move the robot on a substantially horizontal surface. The robot also includes at least one sensor attached to the platform, which is capable of detecting a change on the horizontal surface. The robot further has a computer processing unit for storing, receiving and transmitting data, and a cleaning implement operatively associated with the robot.

Most prior art devices, such as those described above, are able to perform with varying degrees of success only the specific tasks for which they were designed. Attempts have been made to provide systems having the capability of performing more than one function; however such systems generally require compromises that do not always allow the robot to perform each of the functions in an efficient manner.

Israeli patent application number IL183006 by the present applicant, the description of which, including publications referenced therein, is incorporated herein by reference, describes a robotic mobile platform that can be thrown into hostile or hazardous environments and then can travel around an area of interest gathering information and transmitting that information to a remotely located control station. The system of the invention is adapted to provide it's operator with significant information without being exposed directly to actual or potential danger. The system has many advanced sensors and navigational capabilities that are built into the robotic platform that allow relatively simple control over the vehicle and a large amount of information of various types related to its mission to be gathered, analyzed, and displayed at the remote control station.

Because of the specialized nature of the robotic systems described above, it is difficult if not impossible to provide them with different types of sensors and other components that will allow them to be used to carry out tasks different from those for which they were originally designed, or to carry out those tasks better and more efficiently. What is missing in the prior art is a method of easily retrofitting any existing robotic system in order to allow it to carry out advanced observation and surveillance tasks and to be equipped with advanced navigational abilities such as those described in the above referenced IL183006.

It is therefore an object of the present invention to provide a sensor module that can be retrofitted to even the simplest robotic platforms, thereby extending its observation, surveillance, and navigational capabilities.

It is another object of the present invention to provide means for remotely controlling robotic platforms provided with the sensor module.

It is another object of the present invention to provide means for enabling two or more robotic platforms to be operated as a team controlled by one remote control interface.

Other objects and advantages of the invention will become apparent as the description proceeds.

SUMMARY OF THE INVENTION

The invention is a system that is integrated with an existing robotic system in order to extend its observation, surveillance, and navigational capabilities. The system comprises: a sensor module that is attached to the robotic device of the robotic system and a system control station comprising a communication link to the robot control station of the existing robotic system.

The sensor module of the system of the invention is an at least partially hollow pod, which comprises:
- a) one or more imaging sensors comprising a video camera comprising optics that allows the camera to obtain images having a wide field of view;
- b) a processing unit comprising dedicated software programs and memory means;
- c) communication means; and
- d) a power supply.

The sensor module may comprise one or more additional sensors that are selected from the group comprising: video cameras mounted on PTZ mechanisms; sound sensors; volume sensors; vibration sensors; temperature sensors; smoke detectors; NBC (nuclear, biological, chemical) sensors; moisture detectors, and carbon monoxide sensors. The sensor module may comprise one or more of the following components: illumination means; range detection means; a digital compass; and a GPS system.

In preferred embodiments, the processing unit in the sensor module is configured to use multiplexing technology to handle the data received from the sensors and other components on the sensor module and communication to and from the system control station.

The system control station of the system of the invention comprises:
- a) communication means for sending and receiving data;
- b) a processing unit comprising dedicated software and memory means; and
- c) a display screen for displaying images and other information received from the sensor module, information related to the location and trajectory of the robotic device, and information related to the operational status of the sensor module and the robotic device.

The system control station provides the user with:
- a) an interface with the sensor module via a direct communication link, the communication link adapted to allow suitable operational commands to be transmitted to the sensors and components of the sensor module and data to be received at the system control station; and
- b) an interface with the robot control station through a direct communication link, the communication link adapted to allow all functions of the robotic device, both functions that were originally controlled by means of a direct communication link between the robot control station and the robotic device and also new functions made possible by the addition of a sensor module to the robotic device, to be controlled by an operator using the system control station.

The integration of the existing robotic system comprising a robotic device and a robot control station with the system control station is accomplished by means of software, which converts commands from the system control station into commands understood by the robot control station and transmits the converted commands via a communication link to the robot control station, whereupon the robot control station in turn relays commands via another communication link to the robotic device where the commands are executed in the normal manner. The communication link between the system control station and the robot control station can be implemented by means of one or more of the following: a communication receiver unit that is attached to the robot control station; connection to an existing port in the robot control station; and via standard wireless communication.

In embodiments of the invention one or more of the communication link between the sensor module and the system control station, the communication link between the system control station and the robot control station, and the communication link between the robot control station and the robotic device can be wireless and can be two-way links.

In preferred embodiments both the system control station and the sensor module comprise processing units that are configured to work in complete harmony. These processing units are each supplied with software that enables some or all of the following capabilities:
- a) stitching together the views taken by several imaging devices into a panoramic image;
- b) processing images by the use of an automatic Video Motion Detection (VMD) program;
- c) the ability to sort objects in the images into general categories;
- d) the ability to identify specific objects by comparison of the objects in the images with an existing database;
- e) the ability to combine the image processing software with software that enables Optical Character Recognition (OCR);
- f) the ability to assess the range to objects in the environment;
- g) the ability to return via the same route;
- h) the ability to recognize the sky lines in the images taken by the imaging sensors to compare them with a prepared sky line database thus being able to determine the location of the platform; and
- i) the ability to control two or more robotic platforms using one system control station.

The display screen pf the system control station is preferably a graphic user interface (GUI) configured to enable the user to control and navigate the robotic device by means of appropriate GUI buttons on a control bar and input means. Preferably the interface is a touch screen, configured to allow the user to choose the manner of displaying the information from various options, depending on the requirements of the mission and his personal preference, simply by touching the appropriate icon on the screen and to plan the mission and navigate the robotic platform simply by touching locations of interest in the images displayed on the interface.

Embodiments of the system of the invention enable the images displayed on the display screen of the system control station to be one or more of the following: real time images from the observation area; real time images from the observation area integrated with images from previous missions in the same area; aerial photographs of the observation area; real time images integrated with aerial photographs of the observation area; graphical maps; and topographical maps.

DETAILED DESCRIPTION OF THE INVENTION

The present invention is a system comprising a sensor module that can be attached to any existing robot, and a system control station comprising a communication link to the robot control station of the existing robotic system. The communication link between the system control station and the robot control station can be implemented by means of a communication receiver unit that is attached to the robot control station, connection to an existing port in the robot control station, via standard wireless communication, or any other technique used in the art. It is to be noted that the terms "robot", "robotic device", and "robotic platform" are used interchangeably herein to relate to the original device to which the sensor module of the system of the invention is attached.

Figure 1:
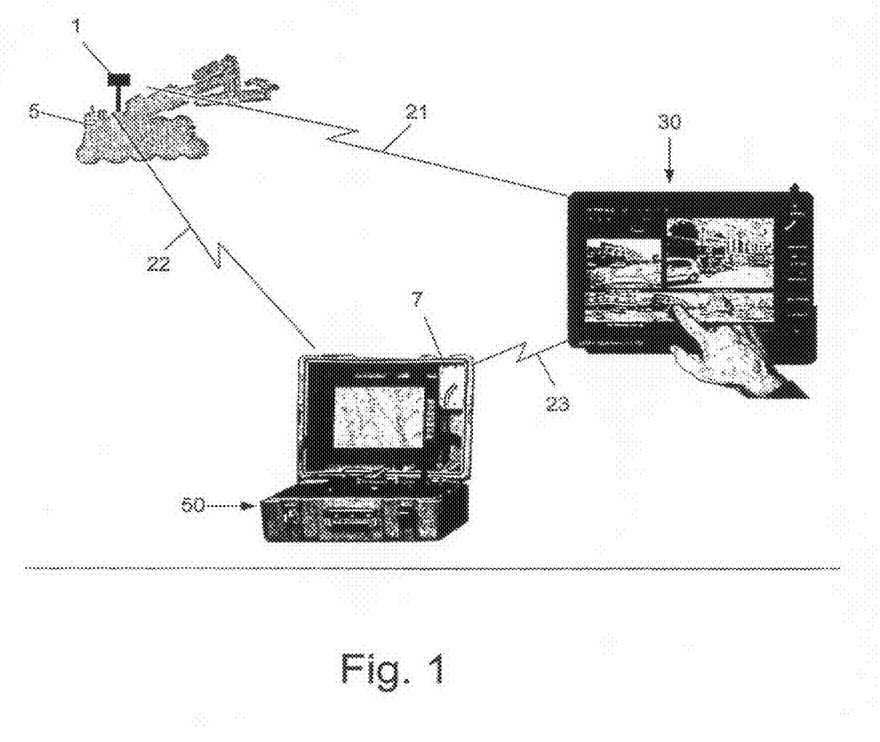
FIG. 1 schematically shows how the system of the invention is integrated with an existing mobile robot.

FIG. 1 schematically shows how the system of the invention is integrated with an existing robotic system in order to extend its observation, surveillance, and navigational capabilities. Before retrofitting with the sensor module (1) of the invention, robotic platform (5) is remotely controlled via communication link (22) by an operator using robot control station (50). According to the invention a sensor module (1) is attached to robotic platform (5). The main function of the sensor module (1) is to gather information from the surroundings of the robotic platform to which it is attached. To accomplish this purpose, the module comprises a variety of sensors, other components, computational means comprising dedicated software programs, communication means, and a power supply, all of which will be described in detail herein below. The system of the invention also comprises system control station (30), which provides an interface between the user of the system and sensor module (1) via communication link (21) thereby allowing suitable operational commands to be transmitted to the components of the module and data to be received at the control station. System control station (30) also comprises an interface with robot control station (50) allowing all functions of the robotic platform, both the original ones. i.e. maneuvering the robotic platform and/or controlling the original components of robotic platform (5) that were controlled using the robot control station (50) and also the new ones made possible by the addition of the sensor module (1) to be controlled by an operator using system control station (30). The integration of the original system comprising robotic platform (5) and control station (50) with the system control station (30) of the invention is accomplished by means of software, which converts commands from control station (30) into commands understood by robotic platform control station (50) and transmits them via communication link (23) to a receiver (7) which is added to robot control station (50). Robot control station (50) in turn relays the commands via communication link (22) to robotic platform (5) where they are executed in the normal manner.

Sensor module (1) can be mounted on essentially any type of robotic platform or machine:

a. Unmanned robotic mobile platforms e.g. robotic platforms designated for use by security forces such as army units, police forces, fire fighters, investigation units, etc., including specialized robotic platforms designated for the use of fighting terrorism, collecting real time information in hostage situations, and remotely controlled mobile robotic platforms used to gather information behind enemy lines. The present invention can also be used for civilian purposes, for example inspecting for leaks of hazardous substances at industrial or regional facilities where nuclear, biological or chemical materials are manufactured, used, or stored. The invention can further be used by private investigators and even as a smart toy for children and adults.

b. Manned robotic mobile platforms e.g. the sensor module can be attached to a motorized wheel chair to aid in maneuvering it or can be added to vehicles to aid the driver in observing his surroundings. In particular the sensor module of the invention will be useful when attached to vehicles from the interiors of which observation is normally very restricted such as tanks and airplanes.

c. Non-mobile robotic platforms e.g. robotic platforms designated for use in industrial facilities and in factories. For example embodiments of the generic module can be attached to a robot machine in a factory to enable remote supervision and quality control of manufactured goods and manufacturing procedures.

In order to illustrate and describe the invention, the description herein will relate to the use of the invention with unmanned robotic mobile platforms. The use of the examples and description provided herein is not meant to limit the possible uses for the system of the invention.

Sensor module (1) can be supplied in an almost infinite number of embodiments. It is basically an at least partially hollow pod to and in which sensors and other components can be attached. The module can be attached to robotic platform (5) by any suitable means known in the art, e.g. magnets, screws, or welding. One of the main advantages of the invention is that many additional features, characteristics and capabilities, can be added to existing robotic platforms without the need of restructuring or disassembling and reassembling the robotic platform.

The main function of the sensor module of the present invention is to provide images of its surroundings. To accomplish this purpose most embodiments of sensor module (1) are equipped with one or more imaging sensors. The imaging sensors preferably cover and enable viewing of the entire space surrounding the robotic platform. Each of the imaging sensors is a video camera comprising optics that allows the camera to obtain images having a very wide field of view. Lens such as those commonly known as fish-eye lens can be used but preferred embodiments of the system make use of lenses that are capable of providing omni-directional views of the surroundings. Typical lenses of this type are described, for example, in International Patent Application WO 03/026272 by the same applicant, the description of which, including publications referenced therein, is incorporated herein by reference.

Figure 2:
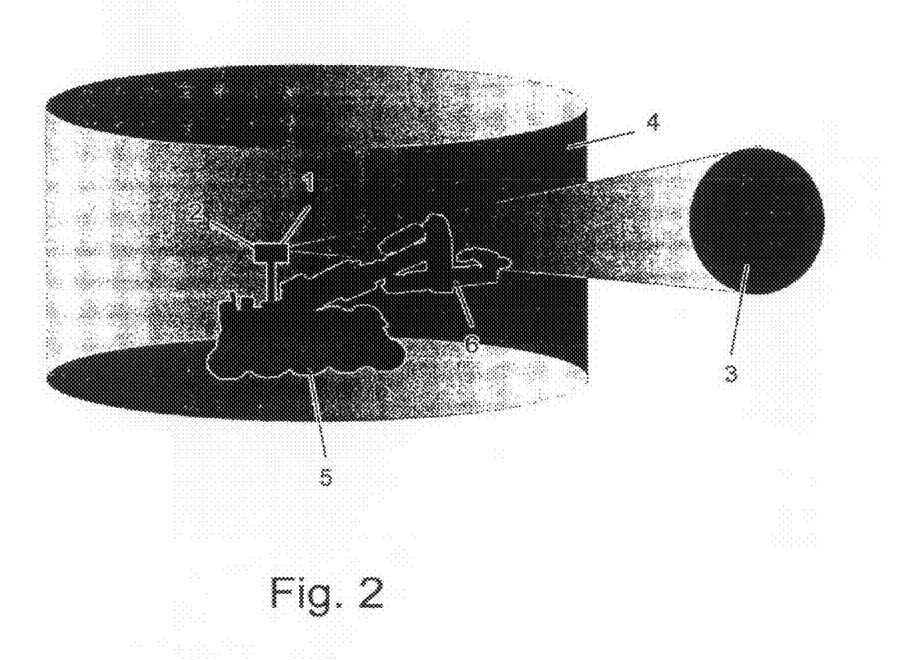
FIG. 2 schematically shows an embodiment of the sensor module of the present invention mounted on mobile robotic platform.

FIG. 2 schematically shows an embodiment of sensor module (1) of the present invention mounted on mobile robotic platform (5). In this embodiment sensor module (1) comprises an imaging assembly comprised of four imaging sensors, wherein each sensor has a horizontal field of view of at least 90° and a vertical field of view of at least 75°. Together the four imaging sensors enable a field of view (4) covering the entire space surrounding the robotic platform (5). To obtain a better view of the surroundings and to prevent parts of the field of view of the imaging sensors being blocked by components such as robotic arm (6) of mobile robotic platform (5), generic sensor module (1) can be mounted on a mast (2). Mast (2) can have a fixed length or its length can be adjusted either manually or by means of a mechanism that can be activated by means of commands from the remote system control station (30) to raise or lower the sensor module (1).

In order to allow operation under any lighting conditions, sensor module (1) can be provided with illumination means. These means are conveniently provided as an array of light emitting diodes (LEDs) surrounding the objective lens of each imaging sensor. Depending on the type of robotic platform and the robotic platform's task, the sensor module comprises imaging sensors capable of producing images in the UV, visible, NIR, or IR regions of the electromagnetic spectrum. All of the imaging sensors in module (1) can operate in the same spectral region or a single module can comprise sensors capable of operating in different spectral regions. The lighting means provided with each sensor are compatible to the sensitivity range of the specific imaging sensor. The lighting means of the system may be a combination of different types of lighting means, e.g. LEDs and halogen lamps.

Preferred embodiments of the sensor module (1) comprise one or more additional imaging sensors with zoom capabilities to assist in navigation of the robotic platform (5), to provide close-up views for tracking of objects of interest detected in the wide-angle views, and for routine search and observation. In preferred embodiments of the sensor module (1) the additional imaging sensors are video cameras mounted on an electro mechanical mechanism of the PTZ (Pan Tilt Zoom) type which enables controlling the viewing angle of the narrow field of view (3) of these cameras. The PTZ imaging sensor is controlled by the user through the system control station (30). However, it is also possible to program computing means onboard the sensor module (1) to implement automatic observation of predefined sectors as required. It is to be noted that the array of LEDs associated with the PTZ imaging sensor is mounted on the PTZ mechanism, which also allows the array to be activated as a searchlight used for directional illumination.

The sensor module (1) comprises a communication assembly which includes a transmitter and a receiver for carrying out two-way communication with the remote system control station (30). The sensor module (1) further comprises computing means and a power source.

In addition to imaging sensors many different types of additional sensors can be installed in different embodiments of the sensor module (1) of the invention. Examples of some of the types of sensors that can be included in the sensor module (1) are sound sensors, volume sensors, vibration sensors, temperature sensors, smoke detectors, NBC (nuclear, biological, chemical) sensors, moisture detectors, and carbon monoxide sensors. Embodiments of sensor module comprise means for measuring the range to objects in the area surrounding the robot.

Located within the interior of the pod of sensor module (1) is a power supply and electric circuit that supplies DC electrical power to the imaging assemblies, additional sensors and other components of the sensor module (1). The power supply is typically a battery package, which is easily accessible by removing one of the covers of the body to enable quick and easy replacement. The batteries can be replaced as necessary but in preferred embodiments they are rechargeable. For long tasks or missions requiring more than the usual expenditure of energy, multiple battery packages can be placed inside the generic module (1). As the charge in one package is depleted it can be replaced by a fully charged package either automatically or on command from the control station. Alternately, each of the energy packages can be connected to a different part of the circuit. In some embodiments solar panels can be provided to recharge the batteries during sunlit hours.

The images gathered by the imaging sensors and data from other types of sensors located on the sensor module (1) can be transmitted back to the control station (30) where all the processing is carried out; however in preferred embodiments of the invention, onboard computing means comprising dedicated software and memory means are located within the interior of sensor module (1). This allows at least a part of the data and image processing to be carried out onboard and the results interpreted and converted to commands to the components of sensor module (1), e.g. changing the viewing angle of the PTZ camera; and/or to automatic operational commands designated for the robotic platform (5) and relayed to it via communication link (21) to system control station (30), communication link (23) to robot control station (50), and communication link (22) to robotic platform (5). The memory means can store information to be used later on as well as information to assist in the operation of the components of the sensor module, e.g. for the image sensors to operate in sleep mode whenever the light level is below a certain threshold value.

Software is supplied, to the computing means in sensor module (1) and/or to the computing means of the system control station (30). This software uses well known techniques for processing the images and can provide the user with many different tools for using the information acquired by the imaging sensors in sensor module (1). Examples of the advanced image processing abilities that the addition of the system of the invention can provide to an existing robotic system are:

- The omni-directional views taken by an imaging assembly comprised of several imaging devices can be stitched together into a panoramic image showing up to a 360° field of view around a vertical line drawn through the center of the imaging assembly.
- The images received can be processed by the use of an automatic Video Motion Detection (VMD) program to detect moving objects in the images supplied by the imaging sensors in sensor module (1).
- Programs can be provided that when used in conjunction with components on the sensor module provide the ability to assess the range to objects in the environment surrounding the robot.
- Programs can be provided that allow sorting of objects in the images into general categories, for example people, animals, vehicles, etc.
- More sophisticated software enables identification of specific objects by comparison of the objects in the images with an existing database.
- The image processing software can be combined with other software programs, e.g. Optical Character Recognition (OCR). This can be useful for various tasks, e.g. identification of license plate numbers.

The remotely located system control station (30) comprises a transmitter for transmitting commands and a receiver for receiving data from sensor module (1). The control station (30) comprises a processing unit with high processing capabilities that allows advanced image processing and information handling techniques and also relatively large memory means to allow storage of both raw and processed data and images. The remote station can be a dedicated unit or can be a standard device, such as a laptop PC or hand-held personal digital assistant, provided with appropriate software. The processing unit of the system control station (30) works in complete harmony with the on board processor of the sensor module (1). In general the more complex tasks, which require larger resources for execution, are carried out at the control station (30) and the simpler processing operations are executed by the processor in the sensor module (1) itself. This division of usage of the processors in the system allows very efficient processing on the one hand and is also very power efficient, reducing considerably battery usage on the sensor module (1) on the other hand.

Figure 3:
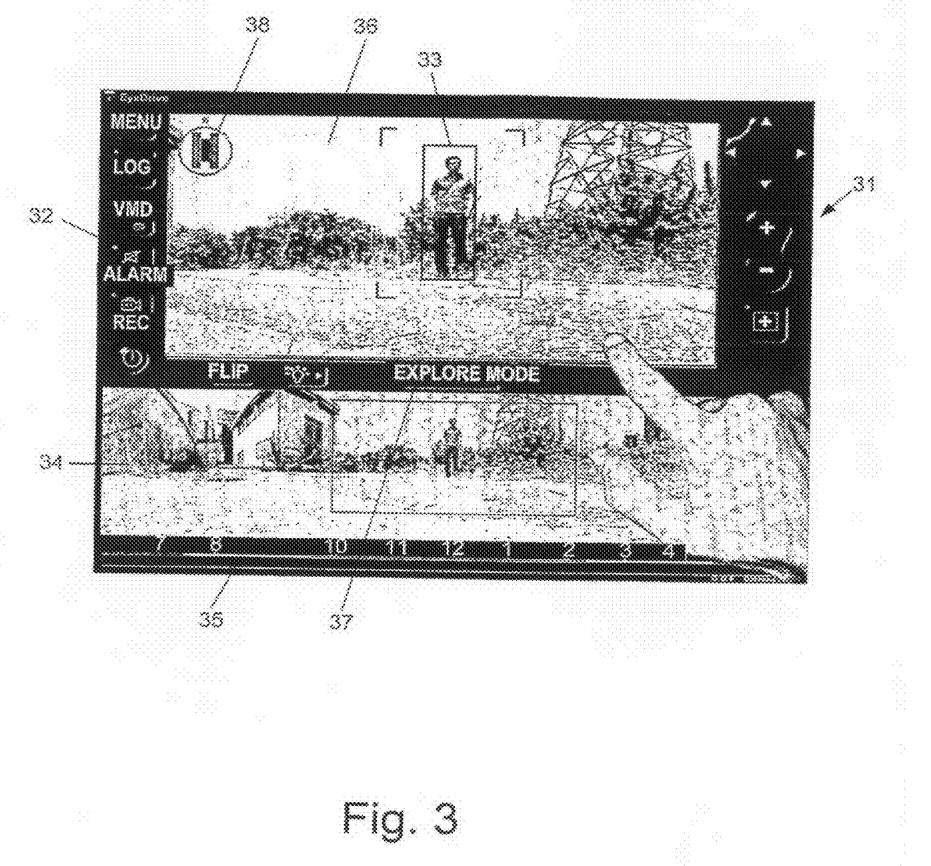
FIG. 3 shows one embodiment of the graphic user interface (GUI) of the system control station of the invention.

The system control station (30) comprises a display screen for displaying the images and other information gathered by the sensors of the sensor module (1). FIG. 3 shows one embodiment of the graphic user interface (GUI) (31) of the system control station (30). Interface (31) is used for controlling and navigating robotic platform (5) by means of appropriate GUI buttons on control bar (32) and input means. The interface is preferably a touch screen, which allows the user to choose the manner of displaying the information from various options, depending on the requirements of the task/mission and his personal preference, simply by touching the appropriate icon or a location on the screen.

The images transmitted from the imaging sensors on sensor module (1) are displayed on interface (31) in a manner that can be very intuitively understood by the user. The processing unit of the control station (30) comprises software that allows many image processing techniques to be executed to accomplish this goal. Omni directional images that arrive at the control station from the imaging sensors on the generic module (1) are seamlessly stitched together to form a single panoramic view displayed in window (34). This view shows the surroundings of the robotic platform (5) with a horizontal field of view of 360 degrees and, in this particular example, a vertical field of view of 75 degrees. To aid the user a ruler (35) is provided, wherein the instantaneous direction directly in front of the robotic platform (5) is designated 12 (o'clock) and the direction directly behind by 6 (o'clock).

If an object of interest is spotted in the panoramic image displayed in window (34), then an enlarged image from the image sensor that most clearly shows a region of interest is displayed in window (36). The sector of the panoramic view to be displayed in window (36) can be chosen by the use of an input command or more simply by touching the region of interest in the panoramic image displayed in window 34 with a finger. When the robotic platform (5) is in motion, window (36) may be used to display the images from the imaging sensor at the front of generic module (1) to aid the user in maneuvering the robotic platform (5) wisely, e.g. to help avoid obstacles or in some cases, to choose a path that will reduce the chances of detection of the robotic platform (5).

If the generic module (1) carries a PTZ camera, then the images from this camera are displayed in window (36). This camera can be operated manually by the user, who sends commands from the control station, or automatically using, for example, the VIVID mode. If there is no PTZ camera mounted on the generic module (1) then electronically magnified areas (33) of the panoramic image displayed in window (34) or the images displayed in window (36). Shown in the upper left corner of window (36) is a graphical display (38) for assisting the operator to understand the orientation of the robotic platform (5) in the field. In this embodiment the sensor module (1) comprises an on-board digital compass that transmits directional data to the system control station (30). The data is processed at the system control station (30). Information such as the direction that the robotic platform (5) is facing relative to north can be displayed (38). The graphical display (38) can also show the angle of the center of the field of view of the image from the PTZ imaging sensor shown in window (36) in relation to the robotic platform. If the robotic platform (5) comprises a PTZ camera, it can also be controlled by control station (30).

By selecting the mode button (37) on GUI (31), the user can move to another display mode, which enables display of other types of operational data regarding the system. Typical information of this sort is information related to the operational mode of the robotic platform e.g. Active, Stand By, Ambush, Explore etc. Other screens can show information such as battery status or the existence of a functional problem, e.g. one of the imaging sensors is not transmitting images etc.

It is to be noted that in some cases the robotic device (5) of the original robotic system comprises sensors, such as a video camera that transmits pictures to robot control station (50). If communication link (23) allows two-way communication, then the software in the system control station (30) allows these images and other information supplied by other sensors on robotic device (5) as well as information relating to the operating parameters of the robotic device to be displayed on GUI (31) and also to be integrated with images and data from sensor module (1).

In all embodiments of the present invention, communication to and from the sensor module (1) and robot by means of communication links (21) and (22) are preferably wireless in order to allow maximum maneuverability. The two-way communication between the sensor module (1) and the remotely located system control station (50) and the robotic platform (5) and the robot control station (50) can be either direct or via a relay station. The relay station can be an independent unit that is carried into the field on the robotic platform (5) and placed at an appropriate location. Communication between system control station (30) and robot control station (50) can be either wireless or wired. Any type of wireless communication technology known in the art can be used in the invention (e.g. Bluetooth, WiMax, WiFi, UWB, etc.) and the data can be transmitted in any form, e.g. digital, analog, encrypted, and compressed.

Figure 4:
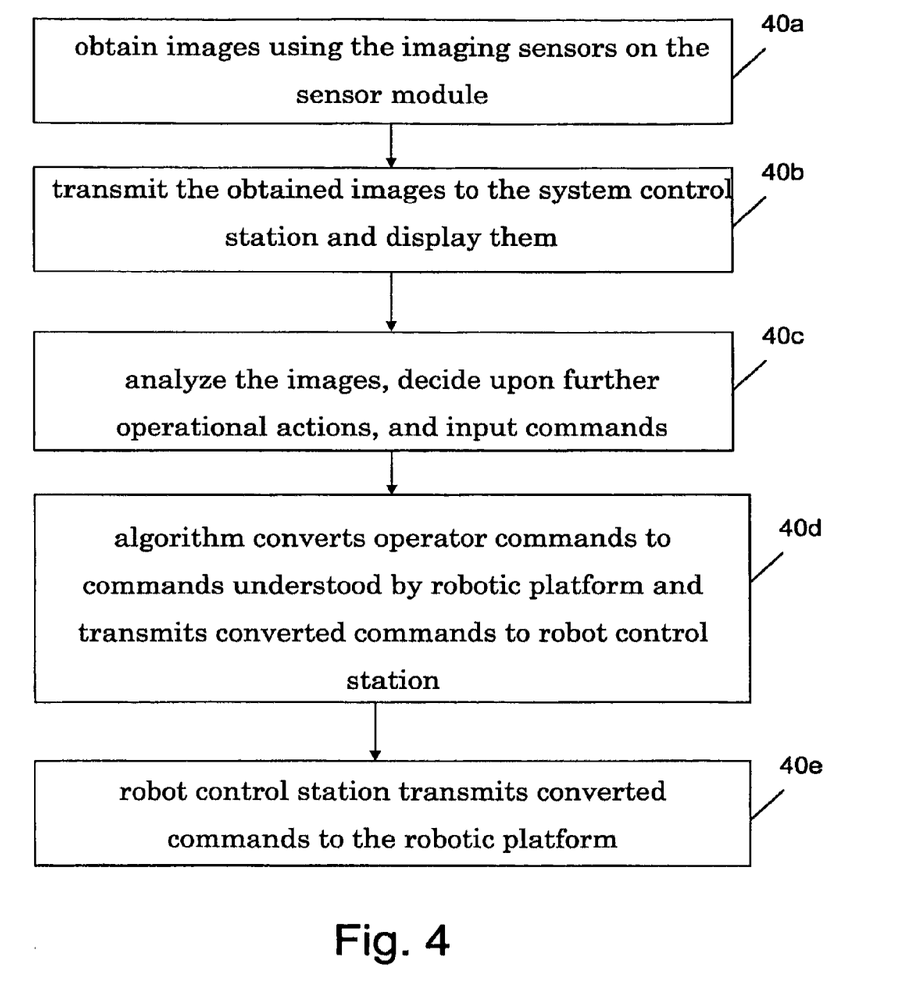
FIG. 4 is a flow chart that describes the main flow of data and operating instructions for using the system of the present invention to remotely direct the motion of the robotic platform.

FIG. 4 is a flow chart that describes the main flow of data and operating instructions for using the system of the present invention to remotely direct the motion of the robotic platform (5). In the first step (40a) images are obtained using the sensors on the sensor module (1). In the second step (40b) the obtained images are transmitted via communication link (21) to the system control station (30) and displayed on the GUI (31). In the third step (40c) the operator analyzes the images and decides on what operational actions he wants to carry out, e.g. to move the robotic platform (5) to a specific destination and which path he wants the robotic platform to take. In this step the operator also inputs commands for executing these actions using GUI (31) of the system control station (30). In the fourth step (40d) an algorithm in the software of the processing unit of system control station (30) converts the operator's commands to matching commands understandable by the robotic platform control station (50). The converted commands are transmitted via communication link (23) to the receiver unit (7) attached to the robotic platform control station (30). In the final step (40e) the converted commands are transmitted via communication link 22 from the robotic platform control station (50) to the robotic platform (5), which begins moving along the designated route to the designated destination.

In preferred embodiments of the invention, the management of instructions received by the sensor module (1) from the system control station (30) and the method by which the data is received from the imaging and other sensors and transmitted to the control station (30) is implemented by the processor in the body of the sensor module (1) using multiplexing technology. The use of an on-board processor using multiplexing technology enables carrying out a number of sophisticated functions such as compressing data, encoding data, controlling the rate of data produced from each imaging sensor, synchronization between the cameras during transmission of the data, and managing the transmission of the data, all within a given bandwidth. Use of multiplexing technology allows the order of the transmission of the data from the imaging sensors to be easily determined and changed. For example, at the beginning of the task/mission, images from all of the imagers can be given equal importance and the images are transmitted in, for example a clockwise order. As the task/mission develops, one sector may become of more interest and the rate of transmission from the sensor/s aimed at that sector is increased at the expense of transmission of images from the imaging sensors that are aimed at sectors of less interest at that time. Each package of data transmitted is given an IP address allowing the receiver in the control station to reconstruct the data.

In addition to providing data related to environmental and other conditions in the area of observation, the sensors can be used to control, or to assist the user to control, the operation of the sensor module (1) and of the robotic platform (5). For example, in a particular operation mode the sensor module (1) and the imaging sensors on it can be in stand by mode with only a sound sensor, i.e. a microphone activated. When the microphone detects a noise, which can be any general noise or a predetermined one of a specific nature, e.g. a human voice, the imaging sensors and the VMD software on sensor module (1) are activated. If the VMD software detects motion, then the onboard communication means, including a transmitter and receiver, which enables sending information to and receiving operating commands from the system control station (30) is activated. The VMD information along with the images are transmitted to the system control station (30) and displayed on the display screen (31) where the operator can decide upon an appropriate response. If the VMD software does not detect any motion, then after a predefined period of time, the system returns to stand by mode. This manner of operating the system provides a very efficient method for reducing the consumption of energy, thereby enabling the sensor module (1) to operate in the observation area for a substantial amount of time.

The use of two or more sensors of different types can be very useful in helping to filter out false alarms. For example, if one type of sensor, e.g. a microphone, detects an occurrence, e.g. a sound similar to human footsteps, that should definitely have been detected by a different type of sensor, e.g. one of the imaging devices, and the second sensor does not send an image of a human, then the signal from the first sensor can, with a high degree of certainty, be considered to be a false alarm.

The software supplied with the computing means of sensor module (1) may include the feature of automatically processing data obtained from the different sensors for the purpose of making recommendations and/or implementing automatic or semi automatic operations. For example, the combination of information provided by one or more of the imaging sensors and a volume sensor can indicate the presence of a person in the vicinity of the robotic platform (5). If the information indicates that the probability that the person detected is hostile is above a predetermined value, then a command can automatically be given to robotic platform (5) (as explained herein below) to start to move towards the target to provide more detailed information. Alternatively, this feature can be semi-automatic i.e. the operator will be asked to approve the recommendations before they are implemented. Alternatively, only recommendations can be provided and the operator will be required to activate and navigate the robotic platform (5) according to his own judgment.

Embodiments of the sensor module (1) of the present invention comprise a system for self mapping, e.g. a digital compass and a GPS system. In these embodiments the processor of the remote system control station (30) enables displaying the exact location of the robotic platform (5) on the GUI (31). The software in the processor enables other capabilities like the production and display of a graphical map showing, for example, the speed and direction of the robotic platform (5) or the boundaries of an observation area. In another embodiment of the present invention, the software in one of the processors of the system comprises an algorithm for identifying and finding a way to travel around obstacles that may be found on the route of the robotic platform (5).

In particularly important embodiments of the invention, the knowledge of the exact location and orientation of the robotic platform (5) is used as input to software programs that allow the processor to integrate the images being transmitted from an observation area with images of the same area acquired on previous missions and stored in a data base or with images from other sources, such as aerial photographs. The integrated images can be displayed in many ways that will reveal information that is potentially even more valuable than that being gathered in the present mission, e.g. the aerial photographs can be used to help visualize more easily the spatial relationship between various objects seen from ground level, the aerial photographs can be used in real time to visualize what lies ahead and therefore help to navigate the robotic platform (5) safely through the region of interest, and the images being gathered in the present mission can be overlaid (or vice versa) on previously obtained images to determine what, if any changes have taken place. Image recognition techniques can be applied to display only detected changes in the entire observation area or changes that have taken place in pre-selected regions or objects.

The GUI (31) of the control station (30), for example in the embodiment shown in FIG. 3, enables the display of the wide angle images gathered by the imaging assembly in the sensor module (1) in an intuitive visual manner that enables the user to easily choose the route and guide the robotic platform (5) along the desired path. The user can concentrate on the image in window (36) to see what lies directly ahead in his path while also glancing at the panoramic image in window (34) to get an overall picture of what is happening and to use this information to decide if he should change direction in order to investigate an interesting object or to chose an easier or safer route to traverse. Navigational instructions can be given to the robotic platform (5) via robot control station (50) by means of conventional means such as a joy stick, GUI buttons, or a mouse, connected to system control station (30).

Preferred embodiments of the invention allow a "touch and go" method of controlling the movements of the robotic platform. The display screen/GUI is a touch screen and the user merely has to touch the screen in one of the displayed images (34, 36) to indicate the direction in which he wants the robotic platform to move. The software in the processor of the remote control station (30) automatically converts the touch on the screen into commands that are sent to the robotic platform control station (50) and from there to robotic platform (5) to control and steer the robotic platform. With a geographical map displayed on the touch screen, the user only needs to touch a location on the map. The processor calculates the azimuth and distance from the present location and orientation of the robotic platform (5) and transmits commands to change the direction of the robotic platform (5) to face the selected location. An additional command is sent either to the sensor module (1) instructing it to send images of the selected location or to the robotic platform (5) to begin traveling towards that location according to the choice of the user. The user can mark out a more complicated route by touching several spots on the map. The control station will then send commands to the robotic platform (5), which will "follow the dots" to travel the desired route. Previously sent commands can be overridden by the user and new ones sent instantaneously by use of the touch screen. The robotic platform (5) can also return via the same route. One way to implement this is use the "dead reckoning" method, wherein the processor stores the navigational commands in a database and sends opposite commands for the robotic platform to return along the same path. Other ways of controlling the motion of robotic platform (5) is to utilize the sky line algorithm described herein below or a GPS system in the sensor module (1). It is also possible to combine two or more of these methods to improve precision and supervision.

In the embodiments of the invention in which the sensor module (1) comprises a GPS system, the GPS data is transmitted to the system control station (30) thus allowing the location of the robotic platform (5) to be displayed on GUI (31). The GPS system makes it possible to preprogram a route for the robotic platform (5) either before it is sent on its mission/task or the route can be transmitted to the robotic platform during its mission/task. In this embodiment a top view or a topographical map of the observation area can be displayed with a marker showing the exact location of the robotic platform (5) and other information, e.g. velocity and projected remaining operational life-time of the batteries, can also be displayed at all times.

In an urban environment the GPS system capabilities can be very limited. In addition there are available low cost transmitters that can be used by interested persons to disrupt the GPS long range signals. Therefore the GPS system can not always be relied upon. The present invention enables a technique for viewing the location of the robotic platform (5) and tracking the robotic platform (5) without using the GPS system. The details of the technique can be found in International Patent Application WO2006/043270 by the same applicant, the description of which, including publications referenced therein, is incorporated herein by reference. In this technique the software either in the computing means in the sensor module (1) or the system control station (30) enables the sky lines in the images taken by the omni directional imaging sensors to be recognized and compared with a prepared sky line database. From this comparison the software is able to calculate the location of the robotic platform (5) with the accuracy of just a few centimeters.

Using the generated maps and other techniques described herein enables the user to transmit automatic navigation commands to a robotic platform (5) to follow the route of another robotic platform that has previously driven the same route. This is a mode of operation known as Follow the Leader (FTL).

In another embodiment of the present invention the operator can use one system control station (30) to control two or more robotic platforms, each of which has a sensor module (1) of the invention attached to it. The system control station (30) is linked by a separate communication link to the robotic platform control station (50) of each of the two or more robotic platforms. Each of the sensor modules (1) on the robotic platforms can communicate independently with control station (30) and they can also communicate between each other. Thus a redundancy in the communications network has been provided that can allow for communication with both robotic platforms even if one of them is in a "dead zone" as far as direct communication with the remote station is concerned. Also the existence of alternative communication routes can be utilized to maximize the efficiency of power consumption or in case of equipment failure. The communication between two robotic platforms can be based on directional IR communication technology in order to minimize the chances of detection during certain missions.

The use of several robotic platforms in the same observation area can provide many operational advantages over the use of a single robotic platform. For example, the user can combine the capabilities of the robotic platforms to work together in a synergetic manner in order to, for example set up the robotic platforms for an ambush, cover a wider area of observation, or to use certain sensors on one robotic platform's sensor module and other types of sensors on the other robotic platform's sensor module, thereby increasing the types of information that can be collected in the observation area. As another example of the benefit of using multiple robotic platforms, if a suspicious sound or motion is detected, one of the robotic platforms can be sent to investigate and at the same time the others can continue exploring the observation area. Another advantage is that the length of the mission can be prolonged by activating the sensors in the sensor module of only one of the robotic platform at a time while the others either blindly follows in the FTL mode with its sensors in a sleep mode. In another operating mode, the second robotic platform and the sensor module attached to it can be shut down until the first robotic platform uses up its available power at which point the second one is awakened and takes over the mission by a signal from either the first robotic platform or the control station and the first robotic platform shuts down.

Division of the tasks between robotic platforms can be automatic; semi automatic, i.e., based on a recommendation made by the system to the user for his approval; or the user can manually give commands for each of the operations. To make possible the automatic and semi-automatic modes, a dedicated software program is installed in the processors of the sensor modules (1). This software makes it possible to define one of the robotic platforms as a commander robotic platform whose sensor module gives commands to the other "pawn" robotic platforms and divides the mission tasks between them. In the automatic mode the system user transmits a command to execute a mission. The sensor module (1) attached to the commander robotic platform receives this command, processes it, sends commands to the commander robotic platform via system control station (30) and robotic platform control station (50). Part of the mission is implemented and sensor module (1) attached to the commander robotic platform sends operating commands to the other "pawn" robotic platforms to complete the mission in the following manner: The sensor module (1) attached to the commander robotic platform sends a command, designated for a certain "pawn" robotic platform, to the control station (30). Control station (30) sends the operational command to the robotic platform control station (50) of the designated "pawn" robotic platform, which sends the operational command to the "pawn" robotic platform, which executes the command. At the same time the sensor module (1) attached to the commander robotic platform can send commands either directly or via system control station (30) to the sensor module (1) attached to the "pawn" robotic platform to activate certain of its sensors. In the semi-automatic mode, the sensor module (1) attached to the commander robotic platform analysis the mission requirements; devises a plan based upon, amongst other things on the capabilities of each of the "pawn" robotic platforms and the sensor modules attached to them and their locations; and sends the plan to the user for either approval or modification before it is executed.

As in the case of a single robotic platform, the processor in the remote control station can process the images and other data received from the two or more robotic platforms on a GUI. Different display options are available including displaying panoramic images and enlarged images from all of the robotic platforms simultaneously or scrolling between different windows. The control station can show images from the sensor module attached to one of the robotic platforms on half of the display screen and images from the sensor module attached to another robotic platform on the other half of the display screen. One of the images can be enlarged at the expense of the other if desired.

Figure 5A:
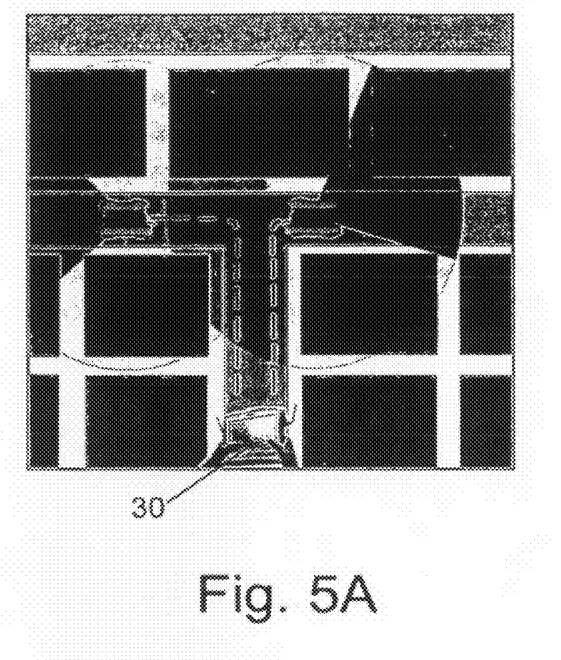
FIG. 5A and FIG. 5B schematically illustrate different modes of displaying on the GUI of the system control station the positions of two robotic platforms in an urban environment.
Figure 5B:
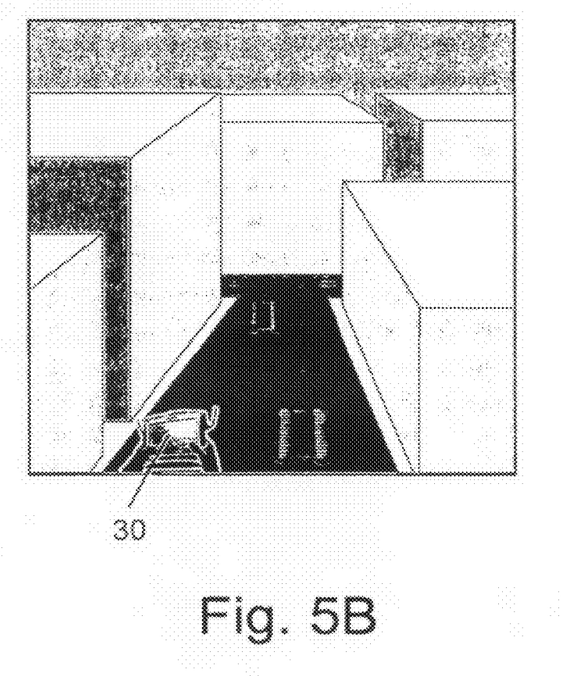

FIG. 5A and FIG. 5B schematically illustrate different modes of displaying on the GUI of the system control station (30) the positions of two robotic platforms in an urban environment. FIG. 5A is a two-dimensional "bird's eye" view and FIG. 5B a three-dimensional view that allows the operator to visually "feel" the two robotic platforms and surroundings and to navigate in an easier manner, as if he were actually in the environment. Both the two dimensional and the three dimensional imaging can be implemented by means of software that processes the images obtained from the sensor modules attached to the robotic platforms or obtained from a database, or from a combination of these two sources.

In embodiments of the present invention the robotic platform control station (50) is a computer, which when provided with appropriate software allows it to function also as the system control station (30) of the present invention. In another embodiment the integral robotic platform control station (50) is integrated into the robotic platform (5), therefore system control station (30) will actually communicate with the robotic platform over two separate communication links. The first link is to control the motion of the robotic platform (5) and the components, such as a robotic arm that comprise the original robot and a second two-way communication link to the sensor module (1).

The robotic platform (5) can be "steered" by commands from the system control station (30) in a number of ways. Some examples of these are The "touch and go" method using a touch screen described herein above can be used.

The system control station (30) can send a series of commands to carry out the motion is steps, for example to make a turn of twenty degrees to the right, a series of commands to make small turns to the right can be sent until the software in the system control station decides according to its calculations that the turn has been completed; the problem with this method is that sending many short commands one after the other can consume a great deal of energy.

A single command can be sent to begin turning to the right and when the software in the system control station decides according to its calculations that the turn has been completed another signal is sent to stop turning. Since this method requires fewer transmissions it will normally consume much less energy than the previous method.

In another method, the sensors on sensor module (1) that is attached to the robotic platform (5) can be used to provide feedback from the field to the system control station (30), informing it for example that the robotic platform has completed a requested turn and that a command should be sent to the platforms drive system to stop executing the turn.

These are just a few examples of the different ways that skilled persons will be able to utilize the capabilities of different embodiments of the invention to control the motion of the robotic platform.

While some embodiments of the invention have been described by way of illustration, it will be apparent that the invention can be carried out with many modifications, variations and adaptations, and with the use of numerous equivalents or alternative solutions that are within the scope of persons skilled in the art without exceeding the scope of the claims.

The invention claimed is:

1. A system that is adapted to be integrated with an existing robotic system in order to extend the observation, surveillance, and navigational capabilities of said robotic system, said system comprising: a sensor module that is attached to the robotic device of said robotic system and a system control station comprising a communication link to the robot control station of said existing robotic system;

wherein both the system control station and the sensor module comprise processing units that are configured to work in complete harmony and are each supplied with software that enables at least one of the following capabilities:
   a. stitching together the views taken by several imagine devices into a panoramic image;
   b. processing images by the use of an automatic Video Motion Detection (VMD) program;
   c. the ability to sort objects in the images into general categories;
   d. the ability to identify specific objects by comparison of the objects in the images with an existing database;
   e. the ability to combine the image processing software with software that enables Optical Character Recognition (OCR);
   f. the ability to assess the range to objects in the environment;
   g. the ability to return via the same route;
   h. the ability to recognize the sky lines in the images taken by the imaging sensors to compare them with a prepared sky line database thus being able to determine the location of the platform; and
   i. the ability to control two or more robotic platforms using one system control station.

2. A system according to claim 1, wherein the sensor module is an at least partially hollow pod, which comprises:
   a) one or more imaging sensors comprising a video camera comprising optics that allows said camera to obtain images having a wide field of view;
   b) a processing unit comprising dedicated software programs and memory means;
   c) communication means; and
   d) a power supply.

3. A system according to claim 2, wherein the sensor module comprises one or more additional sensors that are selected from the group comprising:
   a) video cameras mounted on PTZ mechanisms;
   b) sound sensors;
   c) volume sensors;
   d) vibration sensors;
   e) temperature sensors;
   f) smoke detectors;
   g) NBC (nuclear, biological, chemical) sensors;
   h) moisture detectors, and
   i) carbon monoxide sensors.

4. A system according to claim 2, wherein the sensor module comprises one or more of the following components:
   a) illumination means;
   b) range detection means;
   c) a digital compass; and
   d) a GPS system.

5. A system according to claim 2, wherein the processing unit in the sensor module is configured to use multiplexing technology to handle the data received from the sensors and other components on said sensor module and communication to and from the system control station.

6. A system according to claim 1, wherein the system control station comprises:
   a) communication means for sending and receiving data;
   b) a processing unit comprising dedicated software and memory means; and
   c) a display screen for displaying images and other information received from the sensor module, information related to the location and trajectory of the robotic device, and information related to the operational status of said sensor module and said robotic device.

7. A system according to claim 6, wherein the system control station provides the user with:
   a) an interface with the sensor module via a direct communication link, said communication link adapted to allow suitable operational commands to be transmitted to the sensors and components of said sensor module and data to be received at the said system control station; and
   b) an interface with the robot) control station through a direct communication link, said communication link adapted to allow all functions of the robotic device, both functions that were originally controlled by means of a direct communication link between said robot control station and said robotic device and also new functions made possible by the addition of a sensor module to said robotic device, to be controlled by an operator using said system control station.

8. A system according to claim 7 wherein, the integration of the existing robotic system comprising a robotic device and a robot control station with the system control station is accomplished by means of software, which converts commands from said system control station into commands understood by said robot control station and transmits said converted commands via a communication link to said robot control station, whereupon said robot control station in turn relays commands via another communication link to said robotic device where said commands are executed in the normal manner.

9. A system according to claim 8 wherein, the communication link between the system control station and the robot control station can be implemented by means of one or more of the following:
   a) a communication receiver unit that is attached to said robot control station;
   b) connection to an existing port in said robot control station; and
   c) via standard wireless communication.

10. A system according to claim 7 wherein, one or more of the following communication links are wireless links:
   a) the communication link between the sensor module and the system control station;
   b) the communication link between said system control station and the robot control station; and
   c) the communication link between said robot control station and the robotic device.

11. A system according to claim 7 wherein, one or more of the following communication links are two-way links:
   a) the communication link between the sensor module and the system control station;
   b) the communication link between said system control station and the robot control station; and
   c) the communication link between said robot control station and the robotic device.

12. A system according to claim 6, wherein the display screen is a graphic user interface (GUI) configured to enable the user to control and navigate the robotic device by means of appropriate GUI buttons on a control bar and input means.

13. A system according to claim 1, wherein the interface is a touch screen, configured to allow the user to:
   a) choose the manner of displaying the information from various options, depending on the requirements of the mission and his personal preference, simply by touching the appropriate icon on the screen; and
   b) to plan the mission and to navigate the robotic platform simply by touching locations of interest in the images displayed on said interface.

14. A system according to claim 12, wherein the images displayed on the touch screen are one or more of the following:
   a) real time images from the observation area;
   b) real time images from the observation area integrated with images from previous missions in the same area;
   c) aerial photographs of the observation area;
   d) real time images integrated with aerial photographs of the observation area;
   e) graphical maps; and
   f) topographical maps.

* * * * *